(12) United States Patent  
Saini (10) Patent No.: US 11,993,033 B2  
(45) Date of Patent: May 28, 2024

(54) APPARATUS AND METHOD TO TAILOR FIBER DISTORTION IN COMPOSITE PARTS

(71) Applicant: THE BOEING COMPANY, Chicago, IL (US)

(72) Inventor: Gagandeep Saini, Snohomish, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 17/872,282

(22) Filed: Jul. 25, 2022

(65) Prior Publication Data

US 2022/0355556 A1 Nov. 10, 2022

Related U.S. Application Data

(62) Division of application No. 16/269,614, filed on Feb. 7, 2019, now abandoned.

(51) Int. Cl.
*B29C 70/54* (2006.01)
*B29C 70/44* (2006.01)
*B29D 99/00* (2010.01)

(52) U.S. Cl.
CPC .......... *B29C 70/541* (2013.01); *B29C 70/443* (2013.01); *B29C 70/549* (2021.05); *B29D 99/0003* (2013.01)

(58) Field of Classification Search
CPC . B29C 2043/3655; B29C 43/36; B29C 70/44; B29C 70/443; B29C 70/54; B29C 70/541; B29C 70/549; B29C 70/682; B29C 70/78
See application file for complete search history.

(56) References Cited

U.S. PATENT DOCUMENTS

| | | |
|---|---|---|
| 2012/0076973 A1 | 3/2012 | Guzman et al. |
| 2012/0168071 A1 | 7/2012 | Kennedy et al. |
| 2014/0314996 A1 | 10/2014 | Stewart |
| 2017/0095983 A1 | 4/2017 | Offensend et al. |
| 2018/0029725 A1 | 2/2018 | Batzakis et al. |

FOREIGN PATENT DOCUMENTS

EP    3162544 A1    5/2017

OTHER PUBLICATIONS

Extended European Search Report for EP Application No. 19217732.7 dated Jun. 29, 2020.
Communication Pursuant to Article 94(3) EPC dated Nov. 3, 2021 for EP Application No. 19217732.7.

*Primary Examiner* — Yunju Kim
(74) *Attorney, Agent, or Firm* — Quinn IP Law (57) ABSTRACT

A method for positioning wrinkling of a cured composite material at a predetermined location in fabricating a composite part, which includes positioning a caul plate in contact with an uncured composite material. The uncured composite material has a geometric change in shape and the caul plate has a first slit which extends through and along the caul plate. The method further includes positioning a fiber and a resin of a portion of the uncured composite material within the first slit and curing the uncured composite material positioning a wrinkle within the first slit of the caul plate.

20 Claims, 9 Drawing Sheets

APPARATUS AND METHOD TO TAILOR FIBER DISTORTION IN COMPOSITE PARTS

CROSS-REFERENCE TO RELATED APPLICATION

This application is a divisional of U.S. patent application Ser. No. 16/269,614, entitled "Apparatus and Method to Tailor Fiber Distortion in Composite Parts" and filed Feb. 7, 2019, the entire disclosure of which is incorporated by reference herein.

FIELD

This disclosure relates to fabrication of composite parts, and more particularly to controlling wrinkling in a finished composite part which incurred fiber distortion prior to curing.

BACKGROUND

In fabrication of composite parts compressive strength of a finished composite part is known to be sensitive to the straightness of the fibers within the finished cured composite part. With the presence of waviness of fibers within the composite part, significant loss can be experienced in the strength of the composite part.

An alteration or distortion of fiber straightness can occur in a number of different ways with respect to a composite part prior to curing. Examples of distortion of fibers prior to curing can occur with the composite part experiencing a change in geometry such as the uncured composite part being positioned to extend about a radius of curvature or with the uncured composite part having a ply drop. Regardless of the cause of imparting a change of direction of the fibers within the composite part being fabricated, the change of direction of the composite part can impart tension to fibers in a portion of the composite part and can impart compression to another portion of the composite part prior to curing. With fibers positioned in compression within the uncured composite part, the fibers can be distorted from a straight line alignment and experience bunching of the fibers. With the fibers in a distorted condition, curing of the composite part can result in uncontrolled wrinkling to occur in the cured composite part.

Wrinkles which appear in a cured composite part can identify locations within the composite part where the fibers have been distorted and where the composite part has diminished strength. As a result, the fabricator can add additional composite material to the composite part to reinforce the composite part at those wrinkled locations so as to provide additional strength to the composite part. This procedure of adding composite material adds time, labor and material cost in fabricating the composite part. In addition, this procedure of adding composite material adds weight to the finished composite part. Adding weight to the finished composite part, that is used for example in fabricating an aircraft, contributes to additional cost of operation of the aircraft.

In some instances of uncontrolled wrinkling occurring in the cured composite part, engineering specifications and/or other fabrication regulations, which limit the length and depth of permitted wrinkles in a finished composite part can be exceeded rendering the finished composite part unusable and resulting in the composite part being discarded. As a result, there is a need to control wrinkling which results from fibers being placed in compression condition and are distorted from straight-lined alignment incurred for example with uncured composite material experiencing geometry changes. The control of wrinkling of the finished composite part can avoid the need to add composite material to reinforce the strength of the composite part, which can add weight to a structure being fabricated with the composite part such as an aircraft, resulting in additional operational cost and/or can avoid uncontrolled wrinkling in the composite part exceeding engineering specifications and/or regulatory guidelines and being discarded.

SUMMARY

An example includes a caul plate for application onto an uncured composite material which includes a first slit defined by and which extends through and along the caul plate.

An example includes a method for fabricating a part constructed from an uncured composite material having a geometric change within the uncured composite material, including a step of positioning a caul plate in overlying relationship to the uncured composite material having a geometric change in the uncured composite material, wherein the caul plate includes a first slit defined by and which extends through and along the caul plate.

The features, functions, and advantages that have been discussed can be achieved independently in various embodiments or may be combined in yet other embodiments further details of which can be seen with reference to the following description and drawings.

DESCRIPTION

Various parts used in the assembly of structures are constructed of composite material, which includes fibers and resin. In fabrication of the various parts, the parts are often subjected to alteration of geometric shape prior to being cured. The change in geometric shape of the uncured part results in distortion of straight-lined alignment of the reinforcement fibers within the composite material used in fabricating the part. The distortion of the straight-lined alignment of the fibers can occur by way of, for example, dropping of one or more plies in the construction of the composite part or by way of altering the shape of the composite part so as to conform to a shape of another part, such that the composite material is taken out of being positioned in a flat plane. Changing the shape of uncured composite material being used in constructing the part, by way of example of dropping plies and/or altering the shape of the composite material out of a flat configuration, alters or distorts the straight-lined alignment of the fibers within the uncured composite material from a straight lined orientation.

For example, when fabricating a composite part, which includes the composite material being shaped to follow a curvature of an adjacent part, prior to curing, the fibers in a portion of the composite material which follows the curvature can become distorted from a straight-lined alignment. As the composite material follows the curvature, a portion of the fibers within the composite material can be placed in tension and another portion of the fibers within the composite material can be placed in compression. The fibers subjected to compression can become distorted and tend to bunch. In curing the composite material with bunched fibers, the cured composite part can develop undesired uncontrolled wrinkles. Should the uncontrolled wrinkling, which is indicative of reduced strength for the finished composite part, exceed engineering specifications and/or regulatory guidelines for wrinkling, additional composite material may need to be added to the part being fabricated or the part may need to be discarded.

Figure 1:
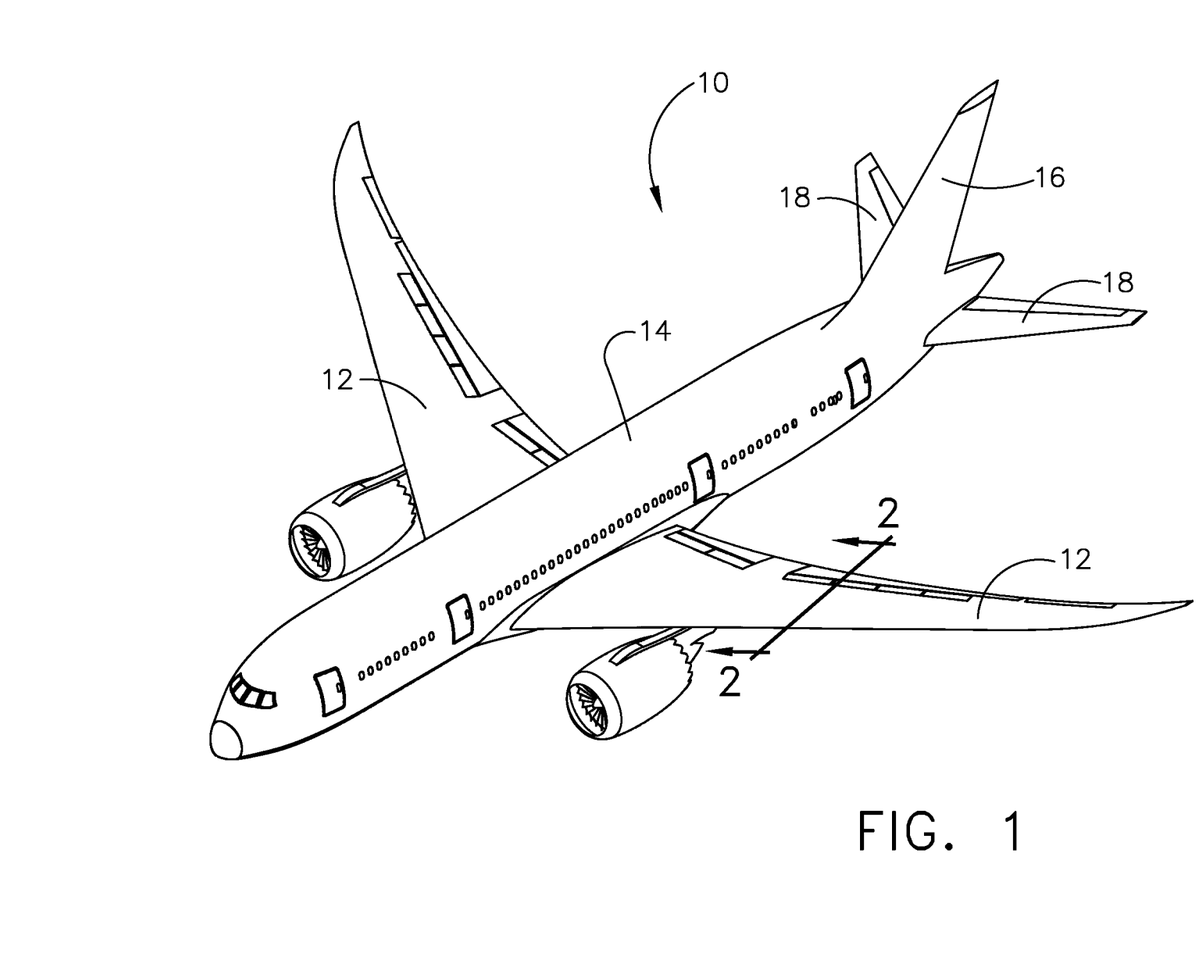
FIG. 1 is perspective view of an aircraft.
Figure 2:
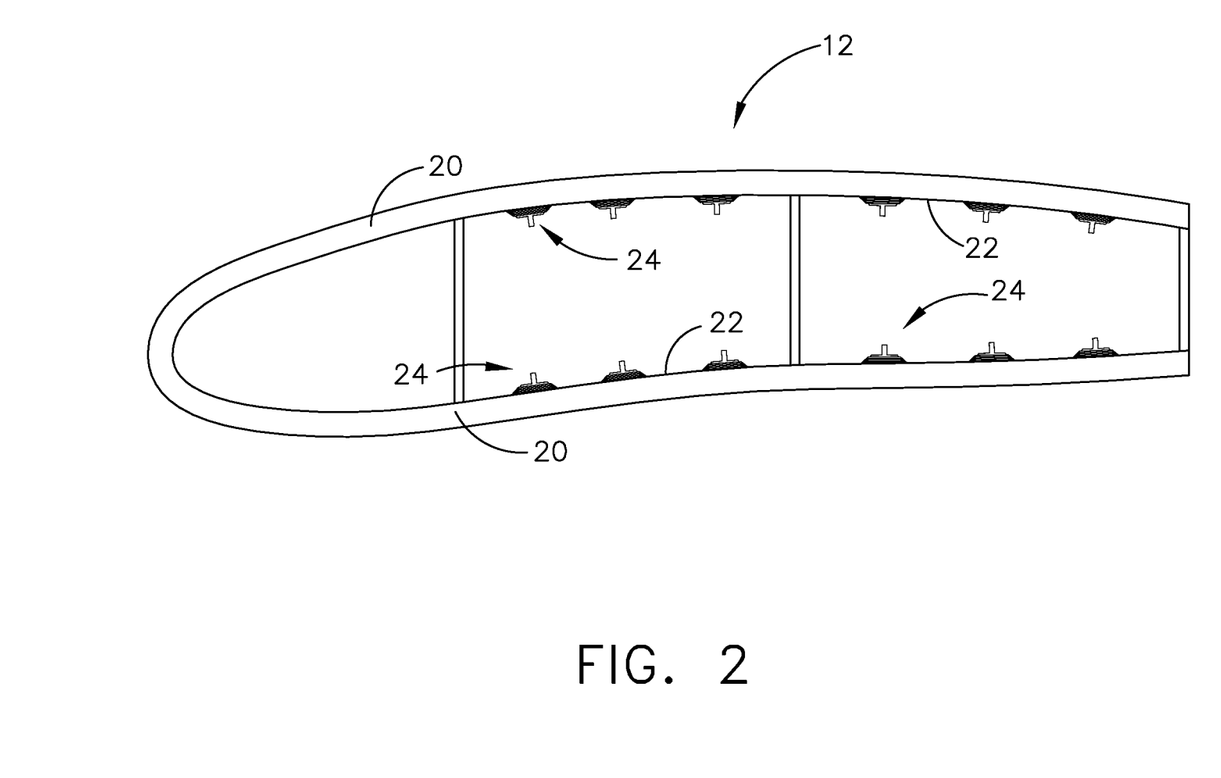
FIG. 2 is a schematic cross section view of a wing constructed of a composite skin and composite blade stringers as seen along line 2-2 of FIG. 1.
Figure 3:
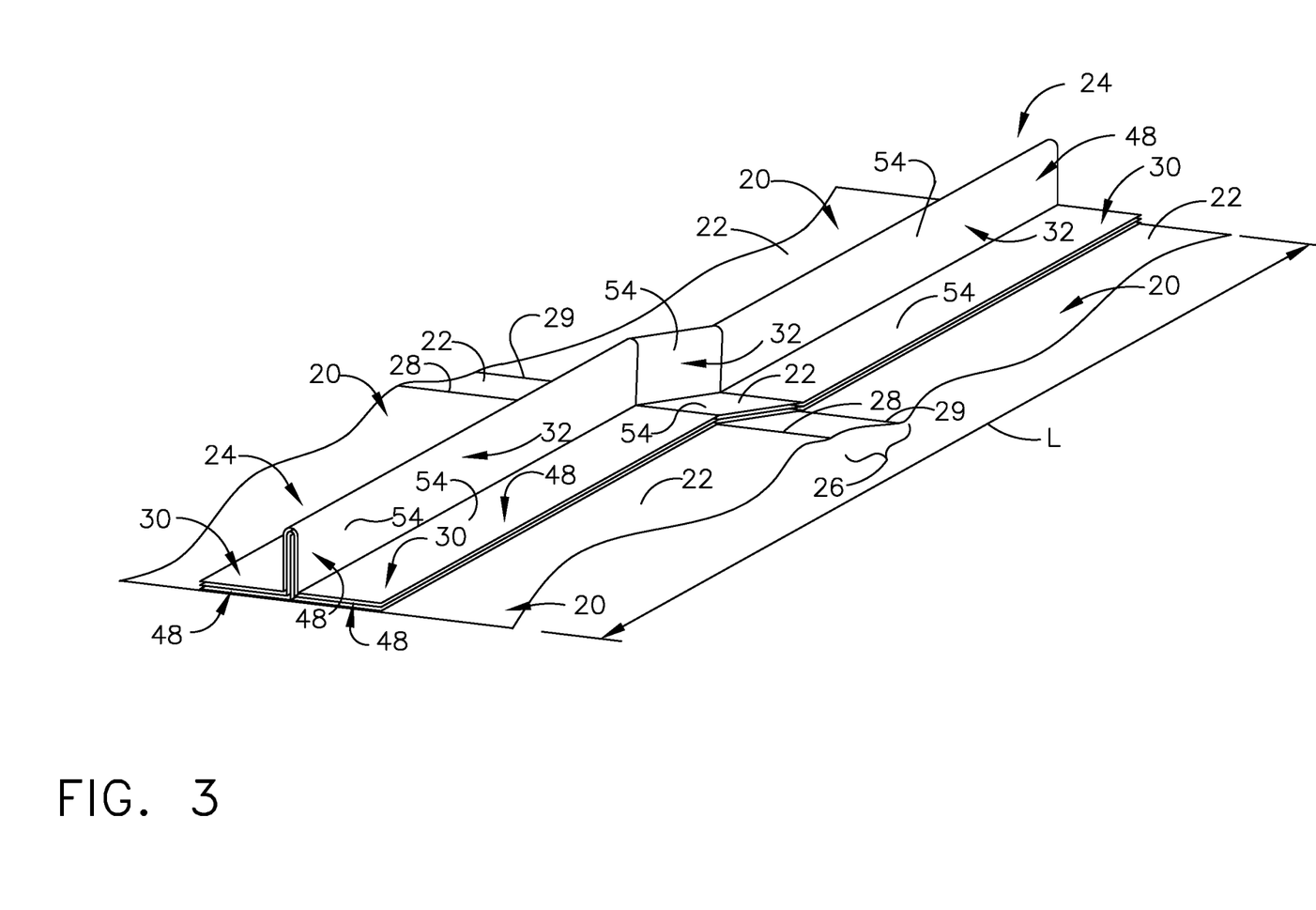
FIG. 3 is a perspective view of an uncured composite blade stringer extending along the composite skin of the wing of FIG. 2.

In referring to FIGS. 1-3, aircraft 10 is an example of a structure having portions of the structure assembled with parts constructed of composite material, wherein the composite parts are subjected to geometric shape change prior to the composite part being cured. Examples of portions of aircraft 10, which have composite parts which are subjected to geometric shape change prior to being cured include, for example, wings 12, fuselage 14, tail stabilizer 16, tail wings 18 as well as other structural portions of aircraft 10 and as well as other portions of other structures which are assembled utilizing composite parts.

An example of a composite part subjected to geometric shape change prior to the composite part being cured is a stringer or stiffener which will be employed for example within wing 12 of aircraft 10. Wing 12 includes composite skin 20 which has an inner surface 22, as seen in FIG. 3, which has a contour which requires blade stringer 24 constructed of composite material 48 to change geometry or shape so as to conform to inner surface 22 of composite skin 20. Blade stringer 24 conforms to inner surface 22 of composite skin 20 so as to optimize securement of blade stringer 24 to composite skin 20 and to optimize stiffening support of blade stringer 24 to composite skin 20. Blade stringer 24 is described herein as an example of a composite part being fabricated wherein the geometry or shape of the composite part is changed prior to curing. Many other configurations of stringers or other composite parts can be used so as to describe the teachings of this disclosure.

Inner surface 22 of composite skin 20 changes elevation or contour of inner surface 22 of composite skin 20 such as with ramp 26 which includes first curvature 28 and second curvature 29. First and second curvatures 28, 29 are positioned at opposing ends of ramp 26 in composite skin 20. The contour or change in elevation of inner surface 22 of composite skin 20 can occur, for example, with ply drops in composite skin 20 in accommodating load demands on wing 12 and/or for accommodating size of wing 12, as wing 12 extends away from fuselage 14. In order for blade stringer 24 to conform to inner surface 22 of composite skin 20, the shape of blade stringer 24 is altered prior to cure of blade stringer 24 such that flanges 30 and web 32 of blade stringer 24 follow the contour or curvature of inner surface 22 of composite skin 20 as blade stringer 24 extends along ramp 26.

Figure 6:
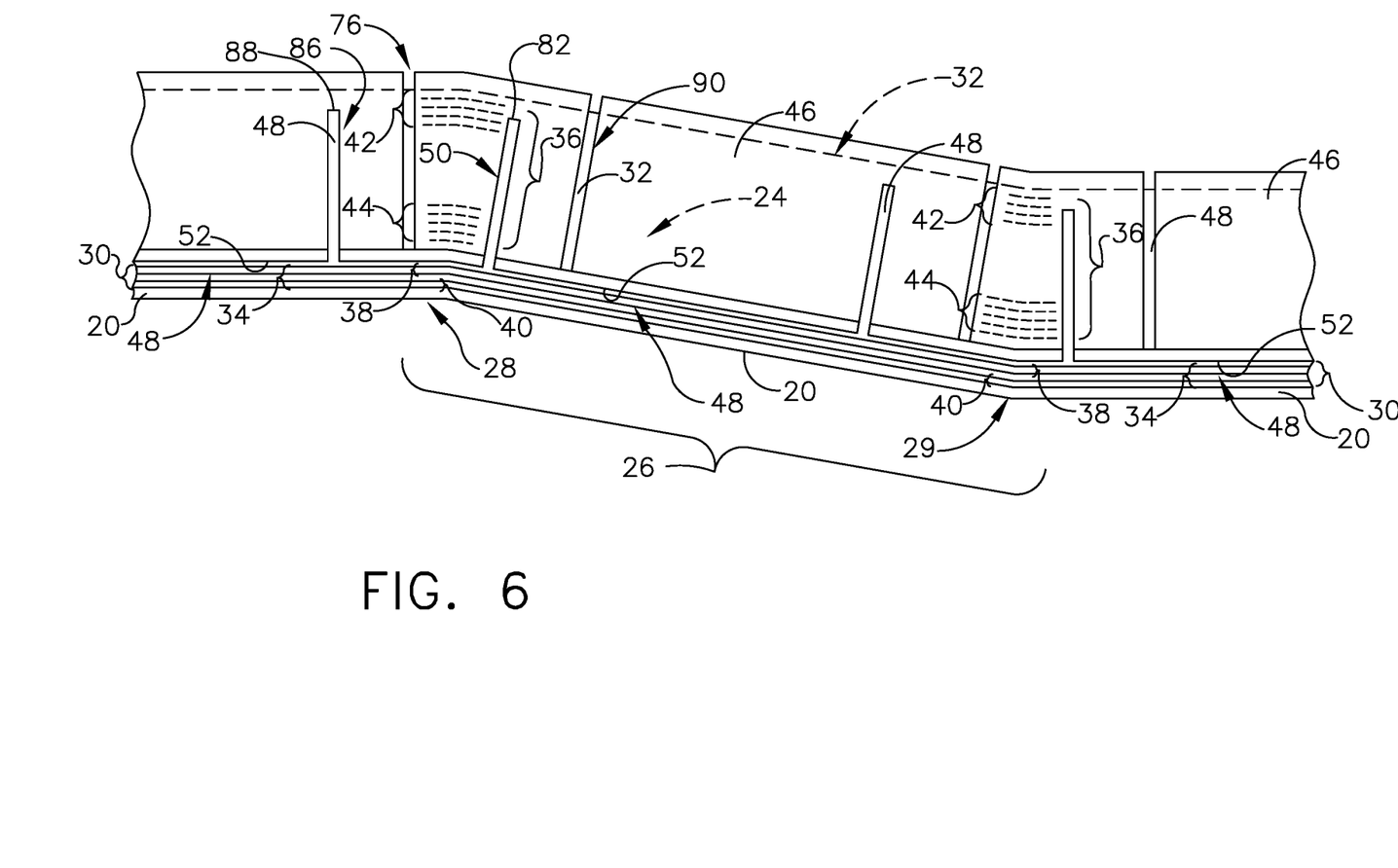
FIG. 6 is a partial side elevation view of the caul plate of FIG. 4 positioned on the uncured blade stringer of FIG. 5.

In referring to FIG. 6, ramp 26 of composite skin 20 is seen with first curvature 28 and second curvature 29 of composite skin 20 positioned at opposing ends of ramp 26, as mentioned above. Flange 30, of blade stringer 24 shown in FIG. 3, underlies caul plate 46 in FIG. 6, includes uncured composite material 48 which has fibers 34 which extend along length L of blade stringer 24, as seen in FIGS. 3 and 6. Web 32 of blade stringer 24, includes uncured composite material 48 which has fibers 36 which also extend along length L of blade stringer 24. With respect to first curvature 28 of ramp 26 of composite skin 20, upper portion 38 of fibers 34 in flange 30 are placed in tension extending along first curvature 28 and lower portion 40 of fibers 34 in flange 30 are placed in compression extending along first curvature 28. At first curvature 28 fibers 36 within web 32, which also extend along length L of blade stringer 24, extend along first curvature 28 of composite skin 20 with upper portion 42 of fibers 36 in web 32 placed in tension and with lower portion 44 of fibers 36 in web 32 placed in compression.

At second curvature 29 of ramp 26 positioned in composite skin 20, fibers 34 of uncured composite material 48 of flange 30 of blade stringer 24 has upper portion 38 of fibers 34 in flange 30 placed in compression, which extends along second curvature 29, and lower portion 40 of fibers 34 in flange 30 placed in compression, which extends along second curvature 29. Fibers 36 within web 32 which extend along second curvature 29 has upper portion 42 of fibers 36 in web 32 placed in compression and lower portion 44 of fibers 36 in web 32 placed in compression.

Figure 4:
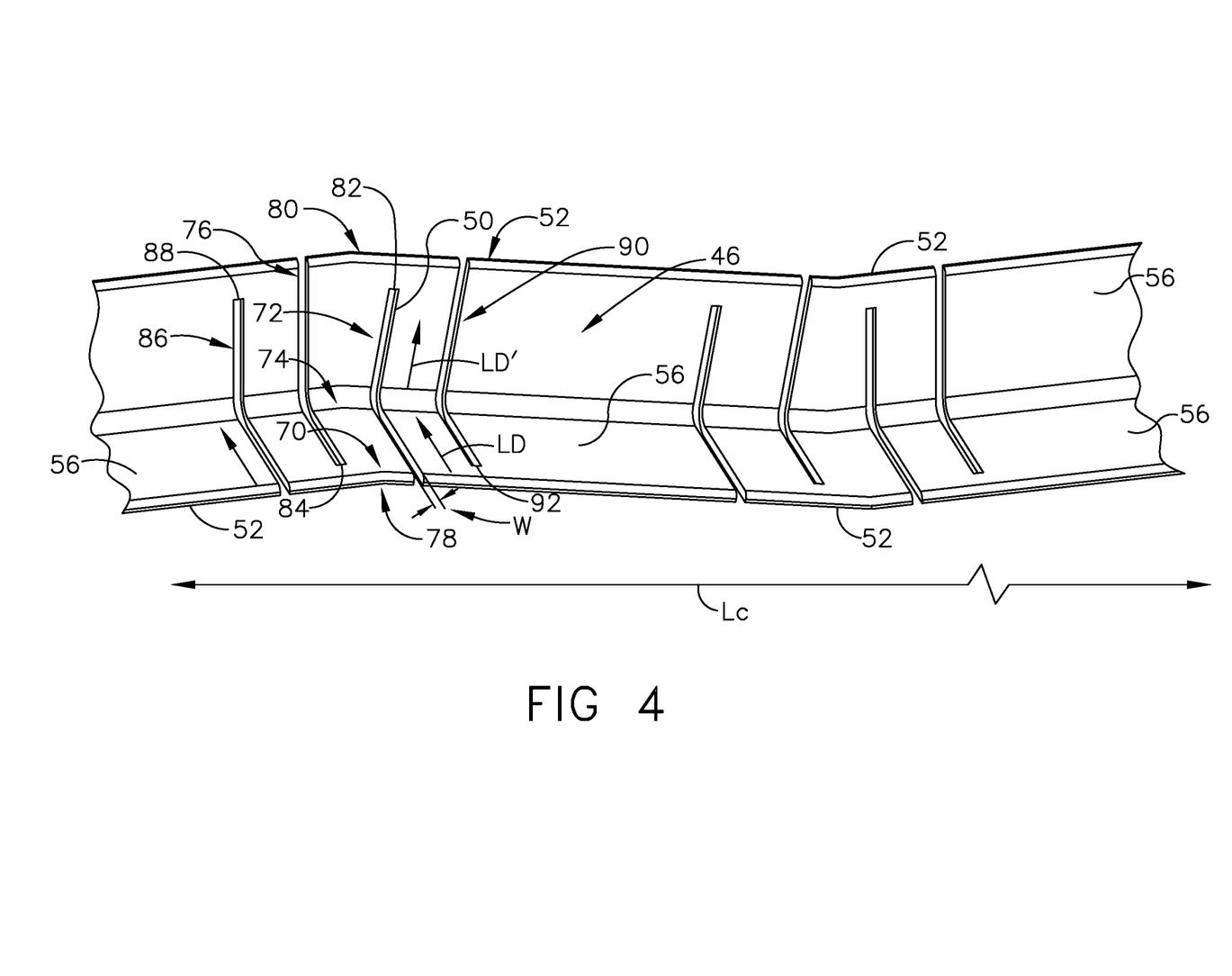
FIG. 4 is a partial perspective view of a portion of a caul plate used in fabrication of the blade stringer of FIG. 3.
Figure 5:
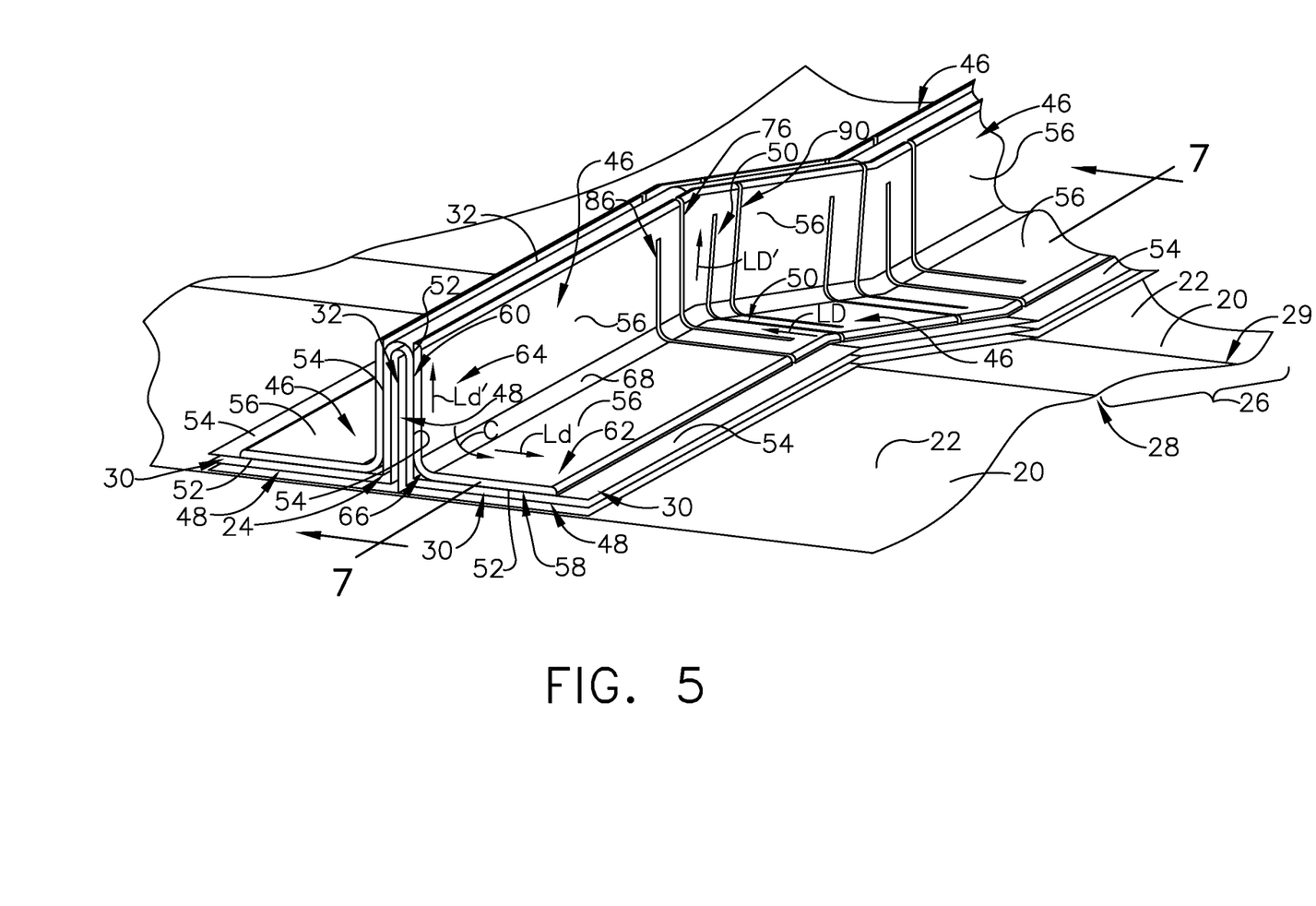
FIG. 5 is a perspective view of the caul plate of FIG. 4 positioned on the uncured blade stringer extending along the composite skin of the wing of FIG. 3.

As a result, with respect to first curvature 28 of composite skin 20, lower portion 40 of fibers 34 of flange 30 and lower portion 44 of fibers 36 of web 32 are positioned in compression resulting in distortion in fibers 34, in lower portion 40 of flange 30 and in fibers 36 in lower portion 44 of web 32 from straight-lined alignment. Similarly, with respect to second curvature 29 of composite skin 20, upper portion 38 of fibers 34 of flange 30 and upper portion 42 of fibers 36 of web 32 are positioned in compression resulting in fibers 34 within upper portion 38 of flange 30 and fibers 36 in upper portion 42 being distorted from straight-lined alignment. Without any mitigating efforts taken, the curing of blade stringer 24, the distorted fibers would cause uncontrolled wrinkling in the cured blade stringer 24. However with application of caul plate 46, as seen in FIGS. 4-6, to uncured blade stringer 24 along with an application of reduced air pressure with placing uncured composite material 48 and caul plate 46 in vacuum bagging (not shown) during the curing process, provides the fabricator with the ability to control wrinkling in the finished cured blade stringer 24, as will be discussed in more detail herein. Controlled wrinkling in the finished blade stringer 24 optimizes use of the finished composite part with blade stringer 24 conforming to the engineering specifications and regulatory guidelines related to amount and size of permitted wrinkling that is permitted in a finished composite part and also optimizes resulting strength of blade stringer 24.

Caul plate 46, as seen in FIGS. 4-6, is positioned onto uncured composite material 48, as seen in FIGS. 3 and 5, which includes uncured composite material 48 of flange 30 and web 32 of blade stringer 24 in this example for utilization in the curing process of blade stringer 24. With caul plate 46 positioned on uncured composite material 48 of a part to be cured, such as blade stringer 24, caul plate 46 and uncured composite material 48, are placed within a vacuum bagging (not shown) and a reduced pressure is applied within the vacuum bagging, as mentioned above, pulling fibers and resin from uncured composite material 48 into slits of caul plate 46 as will be described below. Heat is also applied in the curing process curing uncured composite material 48 resulting in controlled wrinkle(s) being positioned in blade stringer 24 formed from fiber and resin material of the uncured composite material 48 pulled into slit(s) of. In this example, two caul plates 46 are used in constructing blade stringer 24 wherein each caul plate 46 has a L-shaped configuration and is positioned on opposing sides of uncured composite material 48 of blade stringer 24, as seen in FIG. 5. Other shapes of caul plate(s) 46 can be used for accommodating other shapes of stringers or for other composite parts being fabricated, which have a geometric change of shape distorting fibers from a straight-lined alignment in forming composite parts prior to curing.

In referring to FIGS. 4-6, caul plate 46 is used in placing onto uncured composite material 48 for use during the curing process of uncured composite material 48 fabricating a composite part such as blade stringer 24 with controlled wrinkling. Caul plate 46 includes first slit 50 defined by and which extends through and along caul plate 46. First slit 50 extends through caul plate 46 from surface 52 of caul plate 46, for positioning onto surface 54 of uncured composite material 48. First slit 50 extends through caul plate 46 to an opposing surface 56 of caul plate 46, for positioning in facing relationship away from surface 54 of uncured composite material 48, as seen for example in FIG. 5, with surface 52 of caul plate 46 positioned onto uncured composite material 48.

In referring to FIGS. 4 and 5, at least a portion 58 of surface 52, of caul plate 46, which is positioned onto uncured composite material 48 of flange 30 extends in a linear direction Ld as seen in FIG. 5. Similarly, at least a portion 60 of surface 52 of caul plate 46 which is positioned onto uncured composite material 48 of web 32 extends in linear direction Ld', as seen in FIG. 5. At least a portion 62 of opposing surface 56 of caul plate 46 which is positioned facing away from composite material 48 of flange 30 extends in linear direction Ld, as seen in FIG. 5, and at least a portion 64 of opposing surface 56 of caul plate 46 is positioned facing away from uncured composite material 48 of web 32 extends in linear direction Ld', as also seen in FIG. 5. At least a portion 66 of surface 52 extends in a curvilinear direction C and a portion 68 of opposing surface 56 extends in the curvilinear direction C.

In referring to FIGS. 4 and 5, first slit 50 extends in a linear direction LD along portion 70 of caul plate 46 which extends in this example along flange 30 of blade stringer 24 and extends in a linear direction LD' along portion 72 of caul plate 46, which extends in this example along web 32 of blade stringer 24. In this example, with respect to caul plate 46 being used for forming blade stringer 24, portions 70 and 72 of caul plate 46 join one another along a curved portion 74 of caul plate 46 as seen in FIG. 4. First slit 50 extends through caul plate 46 positioned within portions 70 and 72 of caul plate 46 and within curved portion 74 of caul plate 46, as also seen in FIG. 4.

First slit 50 can be made in a variety of width dimensions and length dimensions as needed for forming controlled wrinkles within a composite part being fabricated. In this example, width dimension W includes for example one hundredth of an inch (0.01 inch) up to and including five hundreds of an inch (0.05 inch). Caul plate 46 includes length Lc and first slit 50 extends in linear direction LD along portion 70 of caul plate 46, for positioning onto uncured composite material 48 for flange 30 of blade stringer 24, extending in a transverse direction relative to length L of caul plate 46 as seen in FIG. 4. Similarly, first slit 50 extends in linear direction LD' along portion 72 of caul plate 46, for positioning onto uncured composite material 48 for web 32 of blade stringer 24, extending in a transverse direction relative to length Lc of caul plate 46 as also seen in FIG. 4.

As seen in FIGS. 4 and 6 caul plate 46 further includes second slit 76 defined by and which extends through and along caul plate 46 positioned spaced apart from first slit 50. First slit 50 and second slit 76 extend along caul plate 46 spaced apart from one another and extending in the same direction, and as shown in FIG. 4, parallel to one another. Caul plate 46 includes end 78 and second opposing end 80. First slit 50 extends through end 78 of caul plate 46 and extends toward second opposing end 80 of caul plate 46 wherein end 82 of first slit 50 is defined by caul plate 46 positioned spaced apart from second opposing end 80 of caul plate 46. Second slit 76 extends through second opposing end 80 of caul plate 46 and extends toward end 78 of caul plate 46 wherein end 84 of second slit 76 is defined by caul plate 46 positioned spaced apart from end 78 of caul plate 46.

In further referring to caul plate 46 of FIG. 4, third slit 86 is defined by and extends through and along caul plate 46 is positioned adjacent to second slit 76 with second slit 76 positioned between first slit 50 and third slit 86. Third slit 86 extends through end 78 of caul plate 46 toward second opposing end 80 of caul plate 46. End 88 of third slit 86 is defined by caul plate 46 positioned spaced apart from second opposing end 80 of caul plate 46. Fourth slit 90 is defined by and extends through and along caul plate 46 positioned adjacent to first slit 50 with first slit 50 positioned between second slit 76 and fourth slit 90. Fourth slit 90 extends through second opposing end 80 of caul plate 46 toward end 78 of caul plate 46. End 92 of fourth slit 90 is defined by caul plate 46 positioned spaced apart from end 78 of caul plate 46. The configuration of ends, 82, 84, 88 and 92 of first, second and third and fourth slits 50, 76, 86 and 90, respectively provide continuity in caul plate 46 to extend along length L of blade stringer 24, as seen in FIG. 3, without the need to break caul plate 46 into separate pieces.

Figure 7:
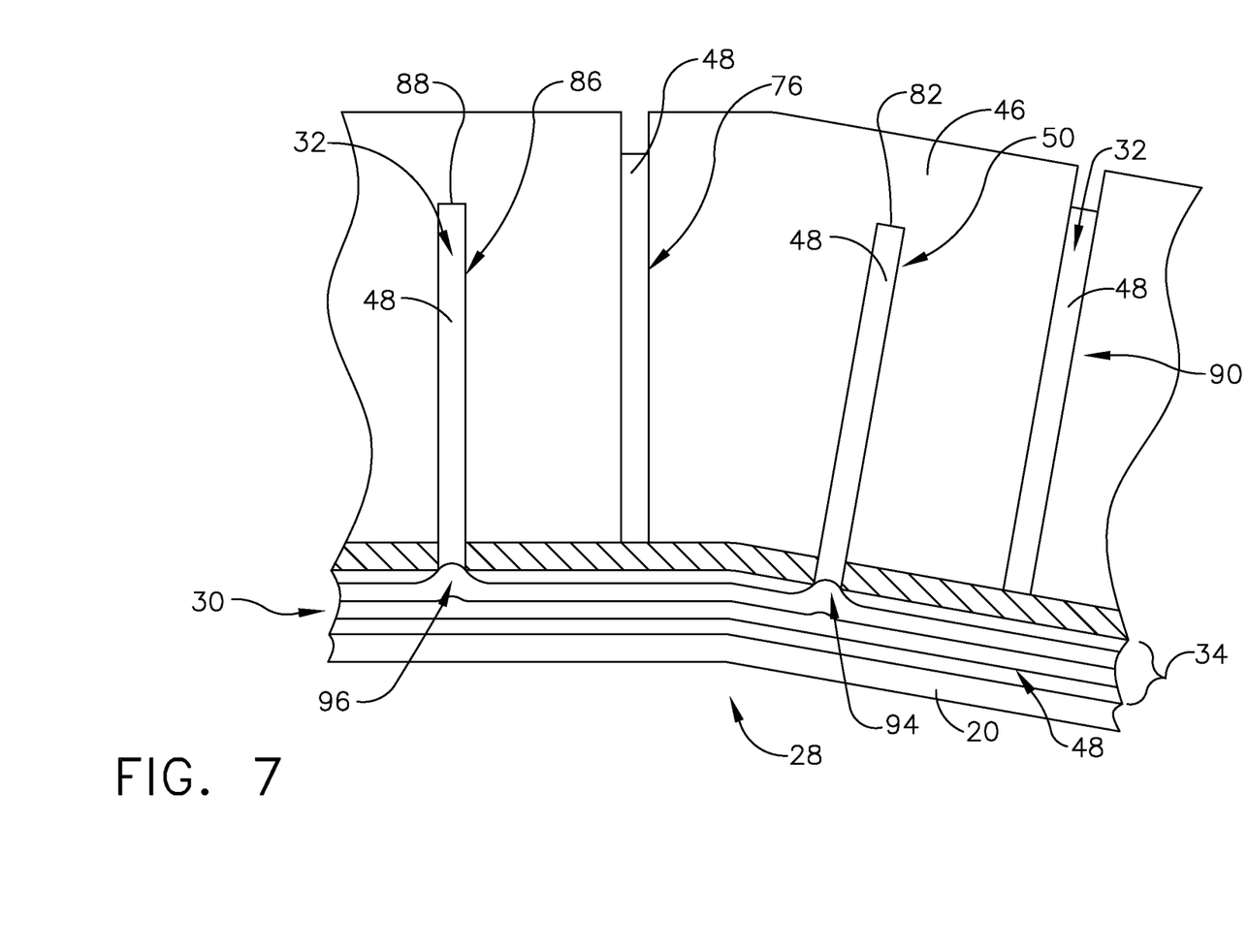
FIG. 7 is a partial enlarged side elevation view of the caul plate of FIG. 6 with a reduced pressure having been applied to an outer surface of the caul plate
Figure 8:
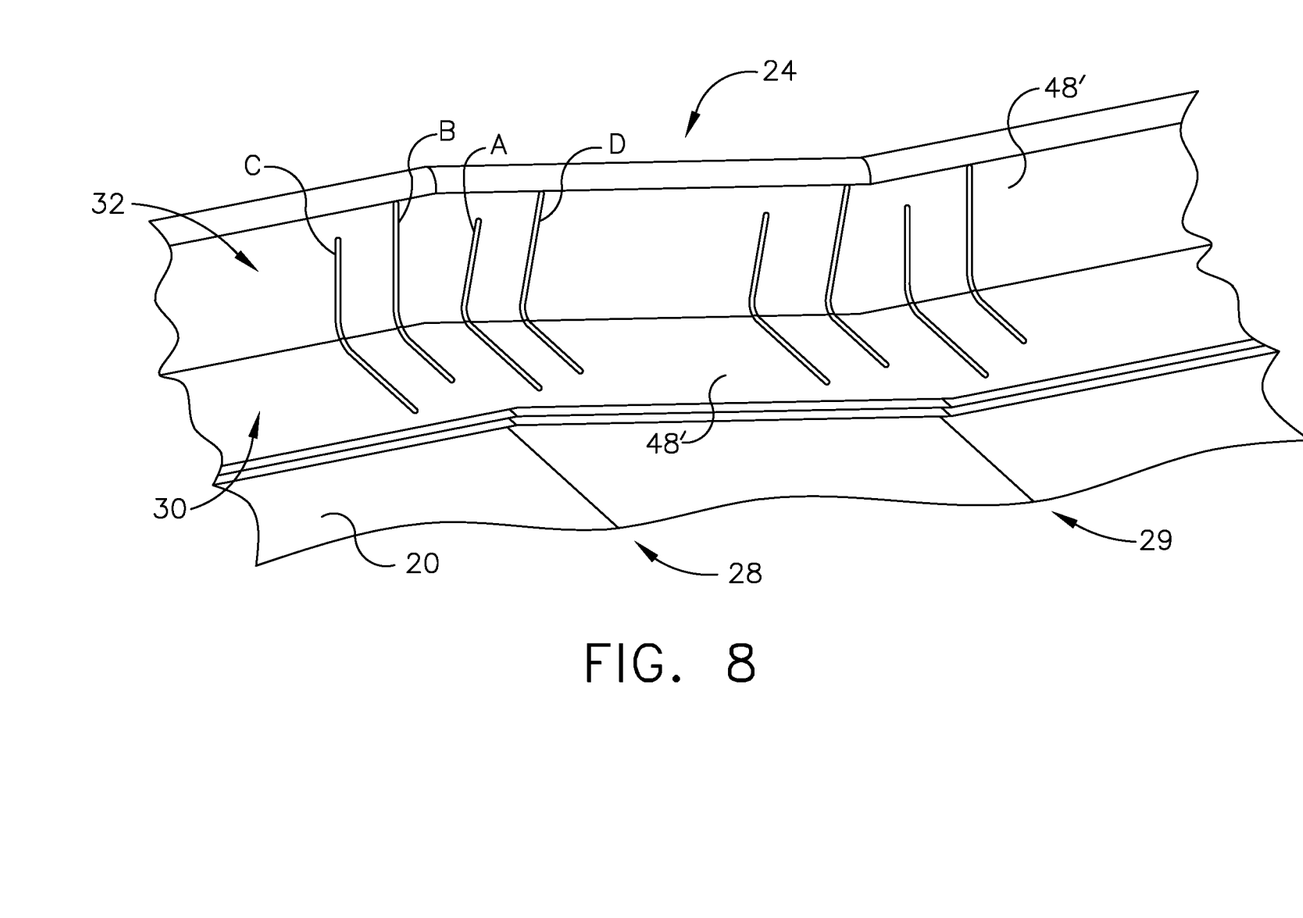
FIG. 8 is a partial perspective view of the blade stringer of FIG. 7 with the caul plate removed from the blade stringer after curing of the composite material and with controlled wrinkles positioned in the blade stringer.

The configuration of first, second, third and fourth slits 50, 76, 86 and 90 respectively are positioned in a locale of first curvature 28 of ramp 26 positioned within composite skin 20. As earlier discussed, distortion of fibers 34 and 36 within flange 30 and web 32 occur as a result of conforming blade stringer 24 to the contour of inner surface 22 of composite skin 20 prior to curing blade stinger 24. The fabricator can position slits and the size of the slits to provide controlled wrinkling in a composite part such as blade stringer 24, such that controlled wrinkling will comply with engineering and regulatory standards for fabrication of such part. The location of and dimension of slits such as first, second, third and fourth slits 50, 76, 86 and 90 by the fabricator will result, for example, in portion 94 of uncured composite material 48 to be pulled into first slit 50 and portion 96 of uncured composite material 48 to be pulled into third slit 86, as seen in FIG. 7. The pulling of uncured composite material 48 occurs with vacuum bagging uncured composite material 48 and caul plate 46 and with the application of reduced air pressure being placed within the vacuum bagging. Uncured composite material 48 of blade stringer 24 is pulled into first and third slits 50, 86 along flange 30 and at the same time along first and third slits 50, 86 (not shown) along web 32 of blade stringer 24. Similarly, (not shown) uncured composite material 48 is also pulled into second and fourth slits 76, 90 along flange 30 and web 32. With uncured composite material 48 pulled within first, second, third and fourth slits 50, 76, 86 and 90, respectively and cured the fabricator has produced wrinkles A, B, C and D of predetermined size and location, as seen in FIG. 8, which correspond to position of first, second, third and fourth slits 50, 76, 86 and 90, respectively of caul plate 46 as seen in FIG. 6. The control of the size and location of the wrinkling provides the fabricator an opportunity to optimize the production of a composite part such as blade stringer 24 so as to comply with the engineering specifications and regulatory guidelines for the amount of permitted wrinkling within the fabricated composite part.

Figure 9:
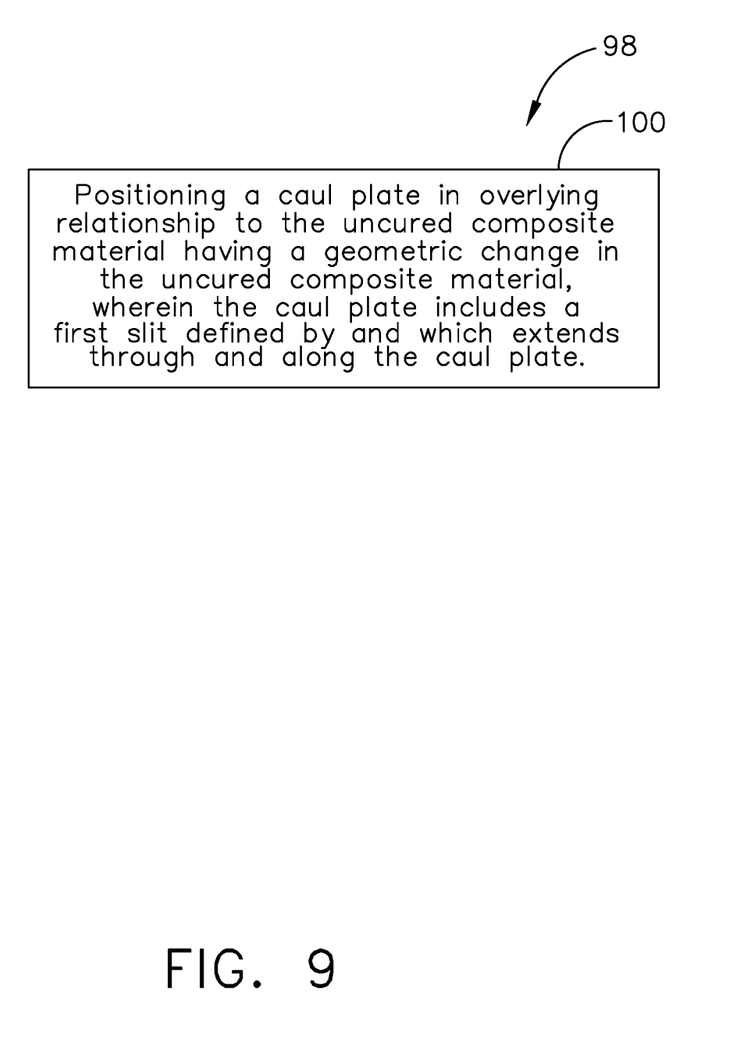
FIG. 9 is a flow chart of method to cure a composite part having a geometric change.

In referring to FIG. 9, method 98 for fabricating a part is shown, such as for example blade stringer 24, constructed from uncured composite material 48, wherein the uncured composite material 48 has a geometric change, such as first curvature 28 of composite skin 20 which imparts a curvature in uncured composite material 48. Method 98 includes a step of positioning caul plate 46 in overlying relationship to uncured composite material 48. Uncured composite material 48 has a geometric change and caul plate 46 includes first slit 50 defined by and which extends through and along caul plate 46. Method 98 further includes placing uncured composite material 48 and caul plate 46 into a vacuum bagging (not shown).

Method 98 further includes placing a reduced air pressure within the vacuum bagging (not shown) pulling a portion 94 of uncured composite material 48 into first slit 50. In addition, method 98 further includes heating uncured composite material 48 in an autoclave, for example, curing uncured composite material 48 and portion 94 of the uncured composite material 48 positioned within first slit 50 forming predetermined and controlled wrinkle A within cured composite material 48 has seen in FIGS. 7 and 8.

First slit 50 of caul plate 46 extends from surface 52 of caul plate 46, for positioning in facing relationship to surface 54 of uncured composite material 48, and extends through a thickness dimension of caul plate 46 to an opposing surface 56 of caul plate 46, for positioning in facing relationship away from surface 54 of uncured composite material 48. Caul plate 46 further includes second slit 76 defined by and which extends through and along caul plate 46 positioned spaced apart from first slit 50. First slit 50 and second slit 76 extend along caul plate 46 spaced apart from one another extending in same direction, as shown for example in FIG. 4 parallel to one another. First and second slits 50, 76 can be used to form predetermined controlled wrinkles A and B as shown in FIG. 8. Additional slits can be provided as needed to produce permitted controlled wrinkling within the composite part which will comply with engineering specifications and regulatory guidelines.

While various embodiments have been described above, this disclosure is not intended to be limited thereto. Variations can be made to the disclosed embodiments that are still within the scope of the appended claims.

What is claimed:

1. A method for positioning wrinkling of a cured composite material at a predetermined location in fabricating a composite part, the method comprising:

positioning a caul plate in contact with an uncured composite material, wherein:

the uncured composite material has a geometric change in shape;

the caul plate includes a first end and a second end spaced from the first end, and the caul plate defines a first slit and a second slit each of which extends through and along the caul plate;

wherein the first slit extends from the first end of the caul plate to a distal end of the first slit that is spaced from the second end of the caul plate, and the second slit extends from the second end of the caul plate to a distal end of the second slit that is spaced from the first end of the caul plate such that the first slit and the second slit form an opposing pattern; and positioning a fiber and a resin of a portion of the uncured composite material within the first slit and the second slit;

curing the uncured composite material to position a wrinkle within the first slit of the caul plate and position a wrinkle within the second slit of the caul plate;

wherein:

the caul plate further includes a third slit and a fourth slit extending through and along the caul plate;

the geometric change in shape includes a ramp that extends angular between a first distal end of the ramp and a second distal end of the ramp;

the caul plate includes a first curvature disposed adjacent to the first distal end of the ramp;

the first slit and the fourth slit are disposed along the ramp proximal to a first side of the first curvature; and the second slit and the third slit are spaced from the ramp proximal to a second side of the first curvature.

2. The method of claim 1, wherein positioning the fiber and the resin of the portion of the uncured composite material within the first slit, includes placing the uncured composite material and the caul plate into a vacuum bag.

3. The method of claim 2, wherein positioning the fiber and the resin of the portion of the uncured composite material within the first slit, further includes placing a reduced air pressure within the vacuum bag pulling the fiber and the resin of the portion of the uncured composite material into the first slit.

4. The method of claim 1, wherein:

the first slit extends through the caul plate from a surface of the caul plate, wherein the surface is for positioning onto a surface of the uncured composite material; and the first slit extends through the caul plate to an opposing surface of the caul plate, wherein the opposing surface is for positioning in facing away relationship from the surface of the uncured composite material with the surface of the caul plate positioned on the uncured composite material.

5. The method of claim 4, wherein at least a portion of the surface of the caul plate extends in a linear direction.

6. The method of claim 5, wherein at least another portion of the surface of the caul plate extends in a curvilinear direction.

7. The method of claim 4, wherein at least a portion of the opposing surface of the caul plate extends in a linear direction.

8. The method of claim 7, wherein at least another portion of the opposing surface of the caul plate extends in a curvilinear direction.

9. The method of claim 1, wherein the first slit extends toward and through a curved portion of the caul plate.

10. The method of claim 1, wherein the first slit extends in a linear direction along the caul plate.

11. The method of claim 1, wherein a width dimension of the first slit includes a width dimension of one hundredth of an inch (0.01 inch) up to and including five hundreds of an inch (0.05 inch).

12. The method of claim 1, wherein:
the caul plate includes a length; and
the first slit is orientated transverse to the length of the caul plate.

13. The method of claim 1, wherein:
the caul plate includes a length; and
the second slit is orientated transverse to the length of the caul plate.

14. The method of claim 1, wherein the second slit extends adjacent to, spaced apart from, and alongside of the first slit.

15. The method of claim 1, wherein the second slit extends toward and through a curved portion of the caul plate.

16. The method of claim 1, wherein:
the third slit is positioned adjacent to the second slit, with the second slit positioned between the first slit and the third slit; and
the third slit extends from the first end of the caul plate to a distal end of the third slit that is spaced from the second end of the caul plate such that the second slit and the third slit form an opposing pattern.

17. The method of claim 16, wherein:
the fourth slit is positioned adjacent to the first slit, with the first slit positioned between the second slit and the fourth slit; and
the fourth slit extends from the second end of the caul plate to a distal end of the fourth slit that is spaced from the first end of the caul plate such that the first slit and the fourth slit form an opposing pattern.

18. The method of claim 1, wherein:
the first slit and the second slit form a first set;
the third slit extends from the first end of the caul plate to a distal end of the third slit that is spaced from the second end of the caul plate such that the second slit and the third slit form an opposing pattern;
the fourth slit extends from the second end of the caul plate to a distal end of the fourth slit that is spaced from the first end of the caul plate such that the first slit and the fourth slit form an opposing pattern; and
the third slit and the fourth slit form a second set that surrounds the first set.

19. The method of claim 18, wherein:
the first set and the second set of the slits form a first grouping at the first curvature;
the caul plate includes a second curvature disposed adjacent to the second distal end of the ramp;
the caul plate includes another set of slits that form a second grouping at the second curvature which are a duplication of the configuration of the first grouping; and
the ramp includes a wall that is continuous between the first grouping and the second grouping such that the slits are spaced from the wall to define an uninterrupted segment of the wall.

20. The method of claim 1, further comprising curing the uncured composite material to position a wrinkle within the third slit of the caul plate and position a wrinkle within the fourth slit of the caul plate.

* * * * *